Nov. 8, 1966  L. R. GURIN ET AL  3,283,434
METHOD AND APPARATUS FOR MOUNTING PHOTOGRAPHIC TRANSPARENCIES
Filed Jan. 2, 1964  2 Sheets-Sheet 1

INVENTOR.
LAWRENCE R. GURIN
BY THEODORE ADLER
ATTORNEY

Nov. 8, 1966    L. R. GURIN ET AL    3,283,434
METHOD AND APPARATUS FOR MOUNTING PHOTOGRAPHIC TRANSPARENCIES
Filed Jan. 2, 1964    2 Sheets-Sheet 2
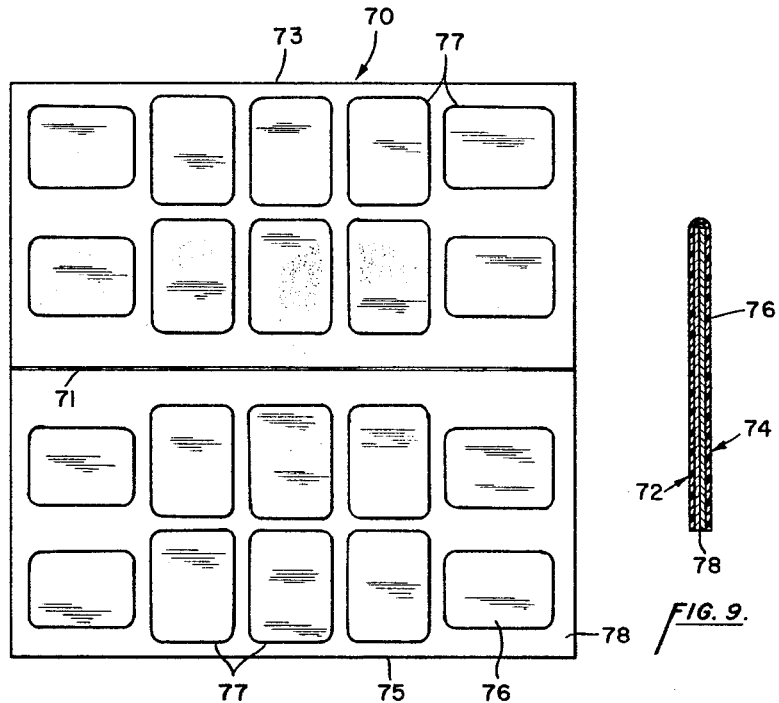
FIG. 8.
FIG. 9.
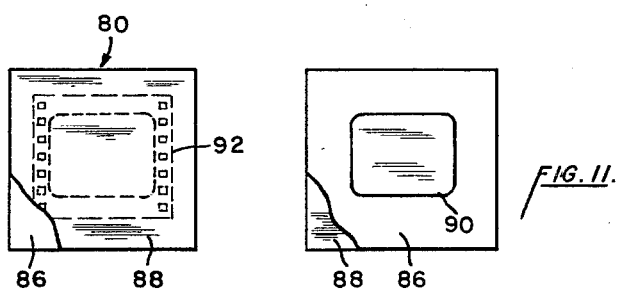
FIG. 10.
FIG. 11.
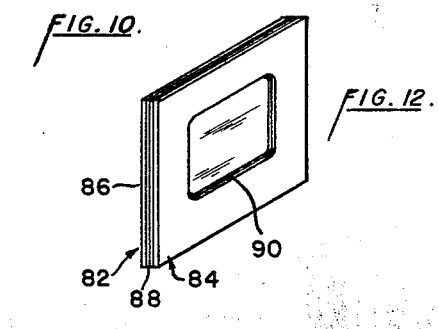
FIG. 12.
INVENTOR.
LAWRENCE R. GURIN
BY THEODORE ADLER
ATTORNEY

United States Patent Office 3,283,434
Patented Nov. 8, 1966

3,283,434
METHOD AND APPARATUS FOR MOUNTING PHOTOGRAPHIC TRANSPARENCIES
Lawrence R. Gurin, 21 St. Marks Place, Mount Kisco, N.Y., and Theodore Adler, 280 Mamaroneck Ave., White Plains, N.Y.
Filed Jan. 2, 1964, Ser. No. 335,008
2 Claims. (Cl. 40—158)

The present invention relates, generally, to a method and apparatus for mounting photographic transparencies.

More particularly, this invention pertains to an apparatus for mounting photographic transparencies comprising a base, said base comprising, in turn, a layer of transparent material, and at least one, and as much as a plurality of recesses particularly adapted to have photographic transparencies disposed therewithin, and a cover comprising, in turn, a layer of transparent material, and a method of disposing said transparencies in visual operative association with said base comprising the step of releasing said transparencies, enabling the same to descend under the influence of gravity into a corresponding one of said recesses.

At the outset, it is to be understood that the term "photographic," or "photography," or any other similar terminology, is to be construed and interpreted in its broadest sense, and specifically is to be interpreted as including any type of transparency upon which a reproduced image has been superimposed, such as images reproduced by X-ray apparatus, camera apparatus, and/or the like. And, in turn, "X-ray apparatus," or any other similar terminology, such as "X-ray transparencies," is to be construed and interpreted as including medical, as well as dental X-rays.

Heretofore, it has been suggested, considering for example the mounting of dental X-rays for purposes of visual analysis, that a cardboard sheet be provided with a plurality of apertures extending therethrough. The sheet is of substantial thickness, enabling the periphery of each aperture to be so constituted and arranged as to present a slot. In accordance with the construction, a dental X-ray must be grasped upon its surfaces by an individual's fingers, inserted into the slot at one end of the aperture, flexed, and finally inserted into the slot at the other end of the aperture. It has also been heretofore suggested that a sheet of resilient plastic be provided, having a plurality of apertures extending therethrough, and a series of two or four tabs positioned about each aperture on both surfaces of the plastic sheet, one or two tabs being positioned upon each surface of the sheet at each end of the aperture, respectively. In this instance, an X-ray is positioned in a corresponding one of the apertures by flexing either the plastic sheet, or the X-ray, and each end of the X-ray disposed between two or four tabs.

In accordance with the above constructions, the X-rays or transparencies are completely exposed to the atmosphere. Frequently, then, the image superimposed upon such transparencies becomes partially, if not completely, obscured by fingerprints, scratches and other types of surface markings, and grime. This disadvantage becomes extremely prevalent when the difficulty, and even the impossibility, of replacing the image on the transparency is realized. In this connection, the above constructions require that the X-ray or transparency be held between an individual's fingers, usually the thumb and forefinger. Thus, the advent of fingerprints upon the transparency is inherent in the design of such constructions as have been heretofore suggested.

In addition, constructions heretofore suggested present substantial bulk, when the dimensional extents thereof are considered relative to its purposes and functions, that is, relative to the dimensional extents of the transparencies mounted thereupon. As a result, a great deal of storage space, such as file cabinets, is required to maintain the transparencies readily available for future use. In fact, it often occurs that the constructions heretofore suggested are too large for presently available storage facilities requiring folding thereof and subsequent permanent damage thereto.

A still further disadvantage resides in the fact that, in the tab-type of construction, the tabs extend inwardly of and into the apertures. Thus, certain portions of the image superimposed upon the transparency tend to be obscured, making it difficult for one to completely visually analyze all of the said image.

Accordingly, having in mind each and every one of the above disadvantages, and others that will be readily apparent to those skilled in the art, it is a primary object of the present invention to provide an apparatus for mounting photographic transparencies comprising a base, said base comprising, in turn, a layer of transparent material, and at least one, and as much as a plurality of recesses particularly adapted to have photographic transparencies disposed therewithin, and a cover comprising, in turn, a layer of transparent material, and a method of disposing said transparencies in visual operative association with said apparatus comprising the step of releasing said transparencies, enabling the same to descend under the influence of gravity into a corresponding one of said recesses.

Another primary object of this invention is to provide an apparatus particularly adapted to mount photographic transparencies for purposes of visual observation and/or analysis, said apparatus being so constituted and arranged as to completely protect said transparencies from abrasions, and fingerprints during and subsequent to mounting the same relative to said apparatus, and to protect said transparencies from the atmosphere subsequent to such mounting, and a method of disposing said transparencies in visual operative association therewith comprising the steps of holding said transparencies only against the edges thereof between the fingers of an individual's hand, and releasing the said transparencies, enabling the same to descend under the influence of gravity into visual operative association with said apparatus.

Yet another primary object of the present invention is to provide an apparatus particularly adapted to mount photographic transparencies for purposes of visual observation and analysis, said apparatus comprising a base comprising, in turn, a layer of transparent material, and at least one, and as much as a plurality of recesses particularly adapted to have photographic transparencies disposed therewithin, and a cover comprising, in turn, a layer of transparent material, enabling said apparatus to present a substantial plurality of said transparencies for visual observation and analysis at a minimum of cost for material and labor, and a method of disposing said transparencies in visual operative association with said apparatus comprising the steps of supporting said transparencies only against the edges thereof, and releasing the same, enabling said transparencies to descend under the influence of gravity into said visual operative association, further enabling the mounting of said substantial plurality of transparencies in a substantially decreased and minimum amount of time.

Further, it is a primary object of this invention to provide an apparatus particularly adapted to mount photographic transparencies for purposes of visual observation and analysis, said apparatus comprising a base comprising, in turn, a layer of transparent material, and at least one, and as much as a plurality of recesses particularly adapted to have photographic transparencies disposed therewithin, and a cover comprising, in turn, a layer of transparent material, enabling the presentation of an apparatus capable of having a substantial plurality of transparencies mounted thereupon for purposes of visual observation and analysis, which said apparatus is of minimum dimensional extent, especially in that direction defining the thickness thereof, and, accordingly, occupies a minimum amount of space, further enabling said apparatus to be disposed within and conserve storage facilities, such as filing cabinets, of at least standard size, and even within storage facilities of decreased dimensional extent, without requiring folding, bending, turning, or otherwise impairing the physical condition thereof.

Still further, it is a primary object of the present invention to provide an apparatus particularly adapted to mount photographic transparencies for purposes of visual observation and analysis, said apparatus comprising a base comprising, in turn, a layer of transparent material, and at least one, and as much as a plurality of recesses particularly adapted to have photographic transparencies disposed therewithin, and a cover comprising, in turn, a layer of transparent material, enabling the presentation of a substantial plurality of said transparencies for the complete visual observation and analysis of the image superimposed upon the surface thereof, and in the absence of any interference of said observation and analysis by any of the component parts of said apparatus, and a method of disposing said transparencies in visual operative association with said apparatus comprising the steps of supporting said transparencies only against the edges thereof, and releasing the same, enabling said transparencies to descend under the influence of gravity into said visual operative association, further enabling the mounting of said substantial plurality of transparencies in a substantially decreased and minimum amount of time.

Other objects and important features of the invention will be apparent from a study of the specification following taken with the drawing, which together show, illustrate, describe and disclose perferred embodiments or modifications of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIG. 8 is a plan view of a further embodiment of an apparatus constructed in accordance with the present invention, and illustrating the component parts thereof in one of a plurality of positions;

FIG. 9 is a cross-sectional view of the apparatus illustrated in FIG. 8, but illustrating the component parts thereof in another of said plurality of positions;

FIG. 10 is an elevational view, partially broken away, of a still further embodiment of an apparatus constructed in accordance with the present invention, and illustrating in phantom, a photogrpic transparency in visual operative association therewith;

FIG. 11 is a view similar to FIG. 10, but without the transparency disposed in said visual operative association; and FIG. 12 is a perspective view of the apparatus illustrated in FIGS. 10 and 11.

Figure 1:
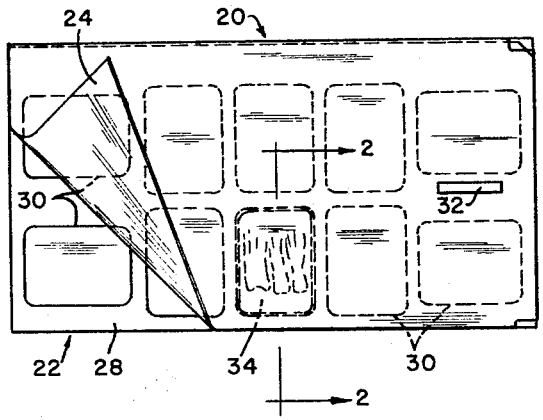
FIG. 1 is a plan view of an apparatus particularly adapted to mount photographic transparencies for purposes of visual observation and analysis, constructed in accordance with the principles of the present invention.
Figure 2:
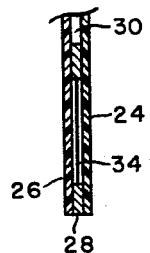
FIG. 2 is a cross-sectional view taken along the line 2—2 of FIG. 1.

Refering now to the drawings, and particularly FIGS. 1 and 2, there is illustrated therein an apparatus particularly adapted to mount photographic transparencies for purposes of visual observation and analysis, said apparatus being generally designated by the reference character 20. The apparatus 20 comprises a base, generally designated by the reference character 22, and a cover 24.

The base 22 comprises a first layer 26, which may be fabricated of any suitable transparent material, such as a urea plastic, a phenolic plastic, and/or the like. Another or second layer 28, fabricated of any suitable opaque or translucent material, such as cardboard, and/or the like, is hermetically laminated upon the layer 26, in any suitable manner, as by means of any suitable heat applying process. The layer 28 is provided with a substantial plurality, that is, a relatively large number, of recesses or apertures 30 extending therethrough. The recesses or apertures 30 may be of any configuration and of any dimensional extent longitudinally and transversely thereof, depending upon the particular configuration and dimensional extent of the photographic transparency to be visually operatively associated therewith. Moreover, the recesses or apertures 30 may be disposed in any pattern relative to the surface of the second layer 28, and, in particular, may be disposed to present the largest plurality thereof.

The cover 24 may be fabricated of any suitable transparent material, and may be fabricated of the same material from which the layer 26 is fabricated. In addition, the cover 24 may be integrally structurally operatively associated with or connected to the layer 26, or may be a separate layer of material fixedly structurally operatively associated therewith or connected thereto in any suitable manner. As pointed out above, the layer 28 may be fabricated of any suitable opaque or translucent material. Additionally, the particular material may be such as to present a suitable writing surface upon which various data pertaining to different ones of the transparencies to be visually operatively associated with the apparatus 20 may be inscribed. To this end, the cover 24 is provided with suitable apertures 32, through which such data may be inscribed upon the surface of the layer 28 subsequent to associating or mounting transparencies relative thereto.

Photographic transparencies 34, such as dental X-rays, and/or the like, are particularly adapted to be disposed within corresponding ones of the recesses or apertures 30, and, therefore, in visual operative association with the apparatus 20. It is merely necessary that an individual's fingers be disposed against the edges of the transparencies 34, as opposed to being disposed upon the surface and at the edges thereof, supporting the transparencies slightly vertically above a corresponding one of the recesses or apertures 30, and releasing the transparencies, enabling the same to descend into said recesses under the influence of gravity.

The number of recesses or apertures 30 generally corresponds to the number of photographic transparencies 34 comprising a complete set thereof for a particular individual. Such a set of transparencies is taken generally simultaneously. Upon development of this set, and their being positioned in visual operative association with the apparatus 20, as described above, the cover 24 is particularly adapted to be disposed in overlying relationship with respect to the base 22 and the transparencies 34, and hermetically laminated thereto, in any suitable manner, as for example by a suitable process for the application of heat.

Thus, in accordance with the above construction, and the method for disposing the transparencies 34 in visual operative association with the apparatus 20, there is avoided, during such association or mounting, and subsequent thereto, the advent of fingerprints and abrasions upon the transparencies 34. Once the transparencies have been mounted or visually operatively associated relative to the apparatus 20, and the cover 24 hermetically laminated to the second layer 28, such fingerprints and abrasions are of course completely precluded. Moreover, subsequent to such mounting, the atmosphere is precluded from acting upon the transparencies 34, thus precluding, in turn, any impairment of the image superimposed upon the said transparencies.

Additionally, in accordance with the above construction, none of the component parts of the apparatus 20 will in any way interfere or obstruct the visual observation or analysis of any of the transparencies. And, to aid in such observation and analysis, suitable data may be inscribed upon the second layer 28 through the apertures 32, as pointed out above.

Figure 3:
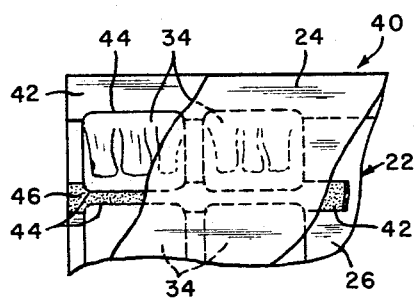
FIG 3 is a detailed plan view of another embodiment of an apparatus constructed in accordance with the principles of the present invention, partially broken away.

Referring now particularly to FIG. 3, wherein like reference characters indicate like parts, another embodiment of the apparatus 20, generally designated by the reference character 40, is illustrated therein. In this modification, the base 22 comprises, in lieu of the second layer 28, a plurality of strips 42, which strips may be fabricated of the same material as the layer 28, and may be fixedly structurally operatively associated therewith or connected thereto in the same manner. Thus, the strips may be hermetically laminated to the layer 28.

The strips 42 comprise a plurality of shallow recesses 44 positioned along the longitudinal dimensional extent thereof, and in spaced relationship with respect to one another. The strip 42 disposed to extend along an edge of the transparent layer 26 is provided with recesses 44 along only one edge thereof. However, the strips 42 disposed medially of the transverse dimensional extent of the apparatus 40, is provided with recesses 44 along both edges thereof. In accordance with this construction, opposed shallow recesses 44 together comprise recesses or apertures, similar to the apertures 30 of the apparatus 20, within which the transparencies 34 are particularly adapted to be disposed.

The apparatus 40 is, in all other respects, similar to the apparatus 20. Accordingly, to so dispose the transparencies 34, it is necessary merely to engage the edges thereof, support the said transparencies slightly vertically above the apertures comprised of opposed shallow recesses 44, and release the said transparencies, enabling the same to descend into a corresponding one of the said apertures under the influence of gravity. Each and every one of the results enumerated above are again achieved.

Figure 4:
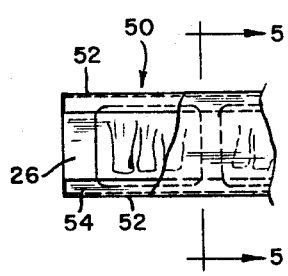
FIG. 4 is a plan view, partially broken away, of still another embodiment of an apparatus constructed in accordance with the present invention.
Figure 5:
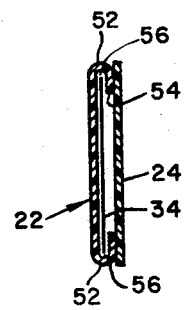
FIG. 5 is cross-sectional view taken along the line 5—5 of FIG. 4.

Referring now particularly to FIGS. 4 and 5, wherein like reference characters indicate like parts, still another embodiment of an apparatus particularly adapted to mount photographic transparencies for purposes of visual observation and analysis, constructed in accordance with the principles of the present invention, and generally designated by the reference character 50, is illustrated therein. In this modification, the base 22 comprises only the layer 26 of transparent material, which may be fabricated of the material as the layer 26 in any of the previous modifications. The layer 26 comprises a plurality of sides or edges 52, which are turned back upon themselves, in any suitable manner, to form generally inwardly extending legs 54. The layer 26 and the legs 54 define between them a plurality of channels 56, extending completely longitudinally of the apparatus 50, and, in particular, of the base 22 thereof, into which channels the transparencies 34 are particularly adapted to be visually operatively disposed.

The transparent cover 24, which may be fabricated of the same material as the cover 24 of any of the preceding modifications, may be integrally structurally operatively associated with the base 22, along one of the edges 52 thereof, or the cover may be a separate element suitably connected to the base, again along one of the said edges.

In all other respects, the apparatus is similar to the apparatus 20 and 40. Accordingly, to dispose the transparencies 34 in visual operative association therewith, it is necessary merely to engage the edges thereof, support the said transparencies slightly vertically above the channels 56, and release the said transparencies, enabling the same to descend into the said channels under the influence of gravity. Each and every one of the results enumerated above are again achieved. In addition, the apparatus 50 is particularly adapted for use in those situations involving a lesser plurality of transparencies pertaining to a single case or individual, and it is not desired to use an apparatus presenting the substantial plurality described above, and illustrated in FIG. 1, for example, wasting those apertures 30 not required.

Figure 6:
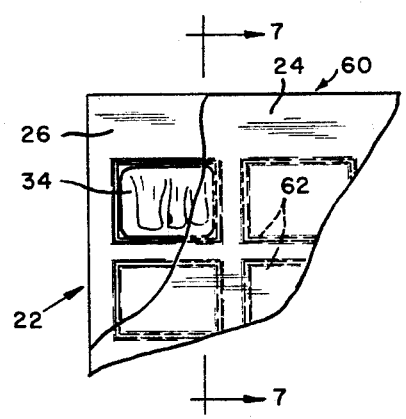
FIG. 6 is a detailed plan view, partially broken away, of yet another embodiment of an apparatus constructed in accordance with the present invention.
Figure 7:
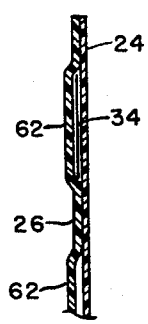
FIG. 7 is a cross-sectional view taken along the line 7—7 of FIG. 6.

Referring now particularly to FIGS. 6 and 7, wherein like reference characters indicate like parts, a further embodiment of an apparatus particularly adapted to mount photographic transparencies for purposes of visual observation and analysis, constructed in accordance with the principles of the present invention, and generally designated by the reference character 60, is illustrated therein.

In this modification, as in the modification illustrated in FIGS. 4 and 5, the base 22 comprises but the transparent layer 26, which layer may be fabricated of the same material as the layer 26 of any of the preceding embodiments. In fabricating the layer 26, however, the same is provided or presented with a plurality of recesses 62 extending outwardly from a surface thereof, which recesses may be of any dimensional extent, and may be disposed in any particular pattern upon and with respect to the layer. It is within these recesses 62 that the transparencies 34 are particularly adapted to be visually operatively disposed.

The transparent cover 24 may be fabricated of the same material as the cover 24 of any of the preceding modifications, and may be integral with the base 26, along one side or edge thereof, or a separate element suitably connected thereto.

In all other respects, the apparatus 60 is similar to the apparatus 20, 40 and 50. Accordingly, to dispose the transparencies 34 in visual operative association therewith, it is necessary merely to engage the edges thereof, support the said transparencies slightly vertically above the recesses 62, and release the said transparencies, enabling the same to descend into the recesses under the influence of gravity. Therefore, each and every one of the results enumerated above are again achieved. The dimensional extent of the apparatus 60 may be chosen as desired, and, in accordance with such dimensional extent, the desired number of recesses 62 fabricated integrally therewith, and, in particular, with the base 22.

Referring now particularly to FIGS. 8 and 9, wherein like reference characters indicate like parts, yet another embodiment of an apparatus particularly adapted to mount photographic transparencies for purposes of visual observation and analysis, constructed in accordance with the principles of the present invention, and generally designated by the reference character 70, is illustrated therein.

The apparatus 70 comprises a base 72 and a cover 74. Each of the base and the cover comprise, in turn, a unitary transparent base sheet 76 and a unitary cover sheet 78 suitably hermetically laminated with respect to one another. The base sheet may be fabricated of any suitable material, and may be fabricated of the same material as the layer 26 of any of the previously described embodiments. The cover sheet 78 may be fabricated of any suitable material, as well, and may be fabricated of the same material as the cover 24. The dimensional extent of each of the base sheet 76 and the cover sheet 78 are substantially the same in each of a plurality of directions.

A score line 71 extends generally completely of the longitudinal dimensional extent of the sheets 76 and 78, and is disposed generally medially of the transverse dimensional extent or width thereof, to facilitate folding the fixedly associated sheets back upon themselves, to thus define the base 72 and the cover 74. The score line 71 thus divides the connected sheets 76 and 78 into halves 73 and 75, enabling the same to be disposed in juxtaposed or abutting face-to-face relationship with respect to one another. Additionally, when disposed in such relationship, the base 72 and the cover 74, as pointed out above, each comprise a layer of transparent material (the base sheet 76), and a layer of opaque or translucent material, such as cardboard, and/or the like (the cover sheet 78).

The sheet 78 is provided with a substantial plurality of apertures 77, disposed upon and extending through each half 73 and 75, on either side of the score line 71. The apertures may be of any suitable dimensional extent, and may be disposed with respect to the cover sheet 78 in any suitable pattern. However, the pattern upon each half is substantially the same. Thus, when the base 72 and the cover 74 are disposed in said face-to-face relationship, the apertures 77 upon each half 73 and 75 will be disposed in alignment with respect to one another. It is within these apertures that photographic transparencies, such as the transparencies 34 previously described, are particularly adapted to be visually operatively disposed. The particular number of apertures 77, as well as the dimensional extent of the base and cover sheets 72 and 74, respectively, may of course be varied to provide apparatus 70 of different sizes, for sets of transparencies of different quantities.

In other respects, the apparatus 70 is similar to the apparatus 20, 40, 50 and 60, as previously described. Accordingly, to dispose transparencies, such as the transparencies 34, in visual operative association therewith, it is necessary merely to engage the edges thereof, support the said transparencies slightly vertically above the apertures 77, and release the said transparencies enabling the same to descend into the apertures under the influence of gravity. Subsequent thereto, the apparatus 70 is folded along the score line 71, to dispose the base 72 and cover 74 in juxtaposed face-to-face relationship, enabling the complete protection of the transparencies from fingerprints, during the mounting thereof and subsequent thereto, abrasions, the atmosphere, and the like. Since the transparent base sheet 76 is disposed, in effect, outwardly of the cover sheet 78, and since the apertures 77 of each of the halves 73 and 75 are aligned, complete visual observation and analysis of any and all of the transparencies will be possible, there being no interference by any of the component parts of the said apparatus.

Upon associating a complete set of such transparencies with the said apparatus, and folding the two halves, the same are particularly adapted to be fixedly associated with one another, in any suitable manner, to provide a permanent record of such transparencies, the physical condition thereof remaining generally in perfect condition.

As pointed out above, the cover sheet 78 may be fabricated of the same material as the cover 24 of any of the preceding modifications. Such material can be cardboard, or any other similar material, which is particularly adapted to have data inscribed thereupon, in proximity to any or all of the apertures 78, which data will pertain to the individual transparencies disposed therewithin. Accordingly, at least one of the halves 73, 75 of the base sheet 76 is particularly adapted to be provided with the apertures 32 through which such data can be inscribed.

Referring now to FIGS. 10 through 12 inclusive, wherein like reference characters indicate like parts, a still further modification of an apparatus particularly adapted to mount photographic transparencies for purposes of visual observation and/or analysis, constructed in accordance with the principles of the present invention, and generally designated by the reference character 80, is illustrated therein. The apparatus 80 is particularly adapted for use with photographic transparencies produced by camera apparatus, or the like, and, for example, camera apparatus capable of use with 35 mm. film.

The apparatus 80 comprises a base 82 and a cover 84, each of which comprises, in turn, a cover sheet 86, fabricated of any suitable material, such as the same material from which the cover 24 is fabricated, namely, cardboard, or the like. The cover sheets are of the same dimensional extent, and are particularly adapted to be disposed in a face-to-face relationship with respect to one another.

Each of the base 82 and the cover 84 comprise, further, a transparent layer 88, which may be fabricated of any suitable material, such as the material from which the layer 26 is fabricated. Each layer 88 is of substantially the same dimensional extent, in each of a plurality of directions, as the cover sheets 86. The layers 88 are particularly adapted to be hermetically laminated to the cover sheets 86, in any suitable manner, as by a suitable process for applying heat.

The cover sheets 86, in turn, comprise an aperture 90, disposed generally centrally thereof, and extending therethrough. The apertures 90 are particularly adapted to be disposed in alignment with one another, when the said cover sheets are disposed in a juxtaposed face-to-face relationship, as particularly illustrated in FIG. 12.

A photographic transparency 92, having an image superimposed thereupon by suitable camera apparatus, is particularly adapted to be disposed between the layers 88 and, in turn, between the cover sheets 86, in mounted visual operative association therewith. The base 82 and the cover 84 of the apparatus 80, each comprising a cover sheet 86 and an inner layer 88, are particularly adapted to be hermetically laminated to one another, as by a suitable process for the application of heat, with the transparency 92 disposed therebetween.

In accordance with the above construction, photographic transparencies, such as the transparency 92, having an image superimposed thereupon by suitable camera apparatus, are protected from fingerprints, abrasions, and the like, especially subsequent to mounting and during the use thereof, enabling the physical condition thereof to remain permanently unimpaired.

It is to be understood that, in any of the above described embodiments, the cover or cover sheet, as the case may be, is particularly adapted to be hermetically laminated to the base, or base sheet, again as the case may be, subsequent to mounting a complete set of photographic transparencies with respect thereto, for purposes of maintaining a permanent record thereof in perfect physical condition. This may be accomplished in any suitable manner. As pointed out above, and in those instances particularly adapted therefor, hermetic lamination may be accomplished by a suitable process for the application of heat. It is, additionally, within the scope of the present invention to apply a pressure sensitive adhesive, in those instances particularly adapted thereto, such as in the instance of disposing layers of cardboard in face-to-face relationship with respect to one another, and even in the instance of disposing a layer of transparent material in said relationship with respect to a layer of such material as cardboard.

For example, in the embodiment illustrated in FIG. 3, the strips 42 may be provided with a pressure sensitive adhesive 46, of any suitable type, enabling the base 22 and the cover 24 to be disposed in a hermetically laminated juxtaposed face-to-face relationship with respect to one another. The provision of such a material is equally applicable to the other embodiments illustrated and described above. The particular adhesive may even be such as to enable indefinite opening and closing of the cover 24 relative to the base 22, enabling the apparatus 40, or any of the other apparatus 20, 50, 60, 70 and 80, to be used more than once with more than one set or group of photographic transparencies, such as the transparencies 34. Any other type of material to perform this function may also be invoked.

It is further within the scope of the present invention, where it is not desired to hermetically laminate the layers with respect to one another, to dispose the same in a removably closed relationship. For example, a layer of transparent material can be folded or turned back upon itself, along one edge or side thereof, enabling the cover sheet or cover to be disposed therebetween, in a manner similar to that in which a matchbook is closed. In this connection, it is possible to provide or present folded ends, as well as sides or edges, providing a connection completely about the periphery of the apparatus. This is of particular significance in an apparatus comprising a separate base and cover to be disposed in overlying relationship with respect to one another upon mounting a complete set of transparencies relative thereto.

It is also to be understood that an apparatus comprising a base fabricated of an opaque material, such as cardboard, or the like, is, as pointed out above, particularly adapted to have various data inscribed thereupon. Accordingly, such an apparatus, comprising a cover of transparent material, is particularly adapted to be provided with apertures through which such data can be inscribed. This is equally applicable to substantially all of the embodiments illustrated and described above.

In accordance with the present invention, therefore, it can be seen that an apparatus has been provided for mounting photographic transparencies in visual operative association therewith, and for maintaining such transparencies substantially in perfect physical condition, which apparatus is of substantially decreased dimensional extent in a direction defining the thickness thereof, thus presenting a minimum of bulk, and occupying a decreased and minimum amount of storage space.

While the invention has been shown, illustrated, described, and disclosed in terms of embodiments or modifications which it has assumed in practice, the scope of the invention should not be deemed to be limited by the precise embodiments or modifications herein shown, illustrated, described or disclosed, such other embodiments or modifications intended to be reserved especially as they fall within the scope of the claims here appended.

We claim:

1. Apparatus particularly adapted to mount photographic transparencies for purposes of visual observation, said apparatus comprising, in combination, a base comprising, in turn, a layer of transparent material, and another layer comprising a plurality of strips having a plurality of shallow recesses positioned generally longitudinally thereof; proposed shallow recesses presenting apertures corresponding generally to one-half the quantity of said recesses, enabling photographic transparencies, corresponding in number to the said apertures, to be disposed in visual operative association therewith; and a cover comprising, in turn, a layer of transparent material; said base and said cover being particularly adapted to be disposed in a juxtaposed face-to-face relationship with respect to one another, enabling the complete protection of said plurality of photographic transparencies from fingerprints, during the mounting thereof and subsequent thereto, abrasions, the atmosphere, and the like.

2. Apparatus particularly adapted to mount photographic transparencies for purposes of visual observation, said apparatus comprising, in combination a base and a cover; said base and said cover being defined by a unitary transparent base sheet; and a unitary cover sheet; said base sheet and cover sheet being disposed in fixed structural operative association one upon the other, and having a score line disposed generally medially in the transverse dimensional extent thereof, and extending generally of the longitudinal dimensional extent thereof, presenting a plurality of halves particularly adapted to be folded back one upon the other; said cover sheet being so constructed and arranged as to have suitable data inscribed thereupon; said cover sheet further comprising a plurality of apertures disposed through each of the halves thereof; the pattern of apertures upon each said half being substantially the same, enabling the said apertures to be disposed in alignment when the halves are folded back upon one another; said base and said cover being particularly adapted to be disposed in a juxtaposed face-to-face relationship with respect to one another, enabling photographic transparencies, corresponding in number generally to one-half the quantity of said apertures in toto to be disposed in visual operative association therewith, further enabling the complete protection of said photographic transparencies from fingerprints, during the mounting thereof and subsequent thereto, abrasions, the atmosphere, and the like.

References Cited by the Examiner

UNITED STATES PATENTS

| | | | |
|---|---|---|---|
| 2,268,529 | 12/1941 | Stiles | 40—152 |
| 2,505,250 | 4/1950 | Kime et al. | 40—152 |
| 2,687,590 | 8/1954 | Johnson | 40—159 |
| 2,835,062 | 5/1958 | Greene et al. | 40—158 |
| 2,952,087 | 9/1960 | Chamberlain | 40—159 |

FOREIGN PATENTS

| | | |
|---|---|---|
| 849,485 | 9/1960 | Great Britain. |
| 878,982 | 10/1961 | Great Britain. |

OTHER REFERENCES

"Modern Plastics," vol. 28; Issue 7; March, 1951; page 134 Classified in 40/10.

EUGENE R. CAPOZIO, *Primary Examiner.*

JEROME SCHNALL, W. J. CONTRERAS,
*Assistant Examiners.*